US012056615B2

(12) United States Patent
Kicanaoglu et al.

(10) Patent No.: US 12,056,615 B2
(45) Date of Patent: Aug. 6, 2024

(54) ICOSPHERICAL GAUGE CONVOLUTIONAL NEURAL NETWORK

(71) Applicant: QUALCOMM Technologies, Inc., San Diego, CA (US)

(72) Inventors: Berkay Kicanaoglu, Amsterdam (NL); Taco Sebastiaan Cohen, Amsterdam (NL); Pim De Haan, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 17/030,361

(22) Filed: Sep. 23, 2020

(65) Prior Publication Data

US 2021/0089923 A1    Mar. 25, 2021

Related U.S. Application Data

(60) Provisional application No. 62/905,233, filed on Sep. 24, 2019.

(51) Int. Cl.
*G06N 3/082* (2023.01)
*G06N 3/045* (2023.01)
*G06T 3/10* (2024.01)

(52) U.S. Cl.
CPC .............. *G06N 3/082* (2013.01); *G06N 3/045* (2023.01); *G06T 3/10* (2024.01)

(58) Field of Classification Search
CPC ....... G06N 3/082; G06N 3/045; G06T 3/0056
USPC .......................................................... 706/25
See application file for complete search history.

(56) References Cited

U.S. PATENT DOCUMENTS

2021/0272233 A1* 9/2021 Kondor ................ G06F 18/214
2021/0295594 A1* 9/2021 Sinha .................... G06V 10/82

OTHER PUBLICATIONS

Bronstein et al., "Geometric Deep Learning", IEEE Signal Processing Magazine, Jul. 2017 (Year: 2017).*
Anonymous: "Gauge Equivariant Spherical CNNS," Sep. 25, 2019 (Sep. 25, 2019), XP055767648, Retrieved from the Internet: URL: https://openreview.net/attachment?id=HJeYSxHFDS&name=original_ pdf [retrieved on Jan. 21, 2021] abstract; Sections 1 and 3-6, 15 pages.
Cohen T.S., et al., "Gauge Equivariant Convolutional Networks and the Icosahedral CNN," May 13, 2019 (May 13, 2019), XP055769217, 15 pages, Retrieved from the Internet: URL: https://arxiv.org/pdf/ 1902.04615.pdf [retrieved on Jan. 27, 2021] abstract; Section 1,2,4,5,9-12.
Cohen T.S., et al., "Spherical CNNs", arxiv.org, Cornell University Library, 201 OLIN Library Cornell University Ithaca, NY 14853, Jan. 30, 2018 (Jan. 30, 2018), XP081219112, abstract, Sections 1. and 3-5, 15 pages.
International Search Report and Written Opinion—PCT/US2020/ 052573—ISA/EPO—Feb. 5, 2021.

(Continued)

*Primary Examiner* — Tsu-Chang Lee
(74) *Attorney, Agent, or Firm* — Seyfarth Shaw LLP

(57) ABSTRACT

A method for generating a convolutional neural network to operate on a spherical manifold, generates locally-defined gauges at multiple positions on the spherical manifold. A convolution is defined at each of the positions on the spherical manifold with respect to an arbitrarily selected locally-defined gauge. The results of the convolution that is defined at each position based on gauge equivariance is translated to obtain a manifold convolution.

28 Claims, 8 Drawing Sheets

(56) References Cited

OTHER PUBLICATIONS

Perraudin N., et al., "DeepSphere: Efficient Spherical Convolutional Neural Network with HEALPix Sampling for Cosmological Applications", arxiv.org, Cornell University Library, 201 OLIN Library Cornell University Ithaca, NY 14853, Oct. 29, 2018 (Oct. 29, 2018), 23 pages, XP081128794, abstract; Sections 1, 2 and 4.

* cited by examiner ance with aspects of the present disclosure.

ICOSPHERICAL GAUGE CONVOLUTIONAL NEURAL NETWORK

CROSS-REFERENCE TO RELATED APPLICATION

The present application claims the benefit of U.S. Provisional Patent Application No. 62/905,233, filed on Sep. 24, 2019, and titled "ICOSPHERICAL GAUGE CONVOLUTIONAL NEURAL NETWORK," the disclosure of which is expressly incorporated by reference herein in its entirety.

FIELD OF THE DISCLOSURE

Aspects of the present disclosure generally relate to artificial neural networking. More specifically, the present disclosure relates to icospherical gauge convolutional neural networks.

BACKGROUND

Simplicity and efficiency of convolution operators on regular grids (e.g., an image plane), in terms of computation, do not extend to other grids/manifolds. For example, convolution operators on regular grids do not extend to a spherical manifold, which is a natural embedding space for omnidirectional, panoramic signals obtained via appropriate imaging setups. Moreover, conventional convolution computation on the spherical manifold is not straightforward due to ambiguities and non-uniqueness of local reference frames. Accordingly, one cannot simply shift a kernel of coefficients over the spherical manifold with just a simple shift.

SUMMARY

In an aspect of the present disclosure, a method is provided. The method includes generating locally-defined gauges at multiple of positions on a spherical manifold. The method also includes computing a convolution at each of the multiple positions on the spherical manifold with respect to a locally-defined gauge. Further, the method includes translating results of the convolution at each position based on gauge equivariance to obtain a corresponding manifold transformation.

In another aspect of the present disclosure, an apparatus is provided. The apparatus includes a memory and one or more processors coupled to the memory. The processor(s) are configured to generate locally-defined gauges at multiple positions on a spherical manifold. The processor(s) are also configured to compute a convolution at each of the multiple positions on the spherical manifold with respect to a locally-defined gauge. Additionally, the processor(s) are configured to translate results of the convolution at each position based on gauge equivariance to obtain a corresponding manifold transformation.

In another aspect of the present disclosure, an apparatus is provided. The apparatus includes means for generating locally-defined gauges at multiple of positions on a spherical manifold. The apparatus also includes means for computing a convolution at each of the multiple positions on the spherical manifold with respect to a locally-defined gauge. Further, the apparatus means for translating results of the convolution at each position based on gauge equivariance to obtain a corresponding manifold transformation.

In a further aspect of the present disclosure, a non-transitory computer readable medium is provided. The computer readable medium has encoded thereon program code. The program code is executed by a processor and includes code to generate locally-defined gauges at multiple positions on a spherical manifold. The program code also includes code to compute a convolution at each of the multiple positions on the spherical manifold with respect to a locally-defined gauge. Additionally, the program code also includes code to translate results of the convolution at each position based on gauge equivariance to obtain a corresponding manifold transformation.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
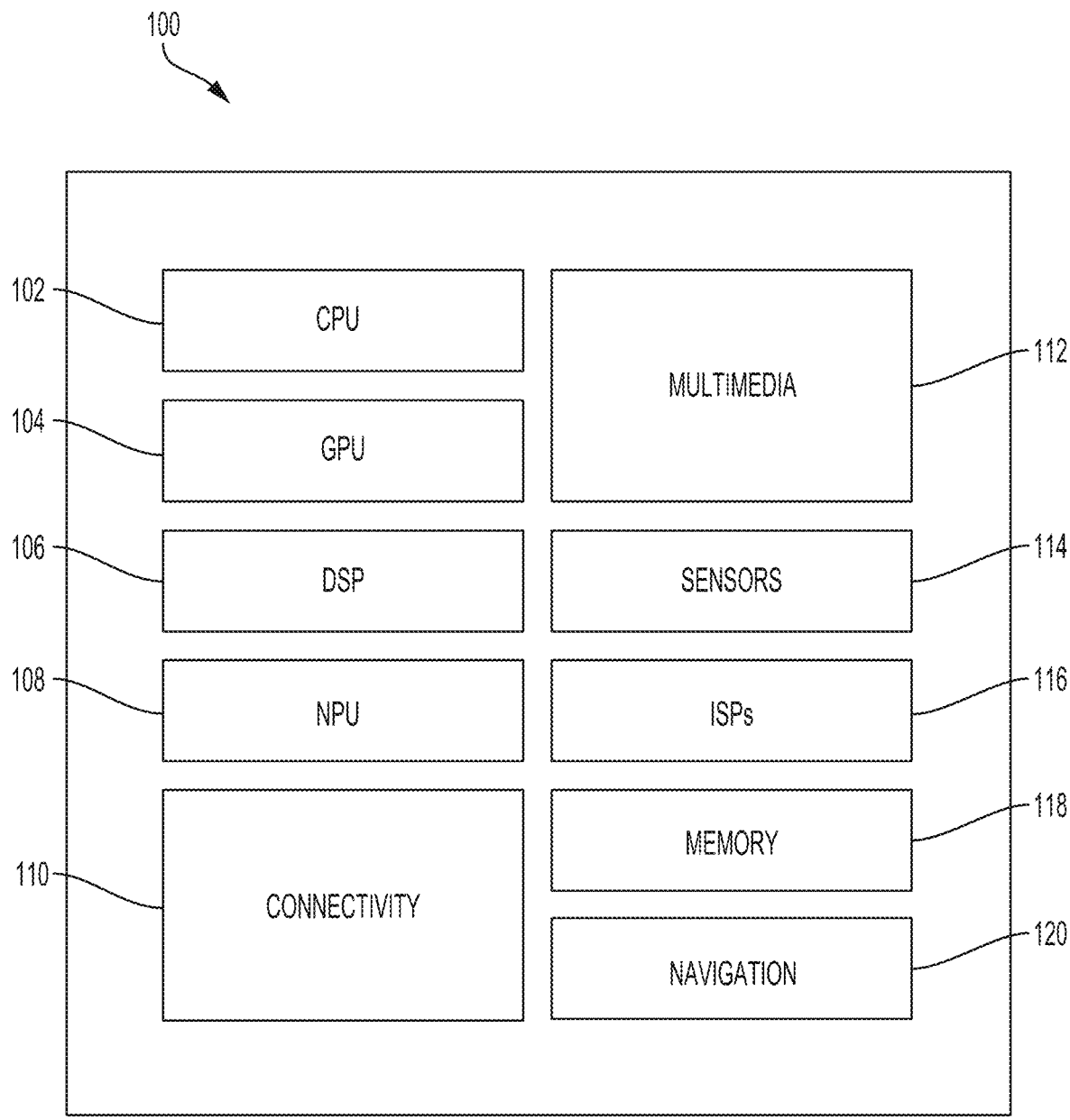
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Spherical CNNs are convolutional neural networks that can process signals on the sphere, such as global climate and weather patterns or omnidirectional images. Simplicity and efficiency of convolution operators on regular grids (e.g. an image plane), in terms of computation, do not extend to other grids/manifolds. For example, convolution operators on regular grids do not extend to a spherical manifold, which is a natural embedding space for omnidirectional, panoramic signals obtained via appropriate imaging setups. Moreover, conventional convolution computation on the spherical manifold is not straightforward due to ambiguities and non-uniqueness of local reference frames. Accordingly, shifting a kernel of coefficients over the spherical manifold is complex and cumbersome.

In many disciplines of science and engineering, spherical signals emerge naturally. In the Earth and climate sciences, globally distributed sensor arrays collect measurements such as temperature, pressure, wind directions, and many other variables. Cosmologists are interested in identifying physical model parameters from real and simulated cosmic microwave background measurements sampled on spherical sky maps. In robotics, especially in applications such as simultaneous localization and mapping (SLAM) and visual odometry, omnidirectional and fish-eye cameras are widely used. Efficient CNNs that directly operate on spherical signals may be beneficial.

Aspects of the present disclosure are directed to utilizing gauge equivariant convolutions to design an efficient convolutional network implementation that can operate on spherical signals. The principle of equivariance to symmetry transformations enables a theoretically grounded approach to neural network architecture design. Equivariant networks have shown excellent performance and data efficiency on vision and medical imaging problems that exhibit symmetries. This principle can be extended beyond global symmetries to local gauge transformations, which enables development of a very general class of convolutional neural networks on manifolds that depend only on the intrinsic geometry, and which includes many popular methods from equivariant and geometric deep learning.

Equivariant principles are used to implement gauge equivariant convolutional neural networks (CNNs) for signals defined on a surface of an icosahedron, which provides a reasonable approximation of a sphere. Gauge equivariant convolution may be implemented using a single two-dimensional convolution (conv2d) call, which makes the implementation highly scalable and a practical alternative to spherical CNNs. Gauge equivariant network theory is applied to a manifold (e.g., the icosahedron). This manifold includes global symmetries (e.g., discrete rotations), which show the difference between an interplay of local and global symmetries. The shape of this manifold makes it possible to implement gauge equivariant convolution in a way that is both numerically convenient (no interpolation is specified), and computationally efficient (the heavy lifting is done by the single two-dimensional convolution (conv2d) call). However, conventional implementations on icosahedron are limited to fixed kernels and are equivariant only up to sixty rotational symmetries of a regular icosahedron.

Aspects of the present disclosure are directed to a method for generating a convolutional neural network to operate on a spherical manifold. The proposed method includes generating locally-defined gauges at multiple positions on the spherical manifold. The method also includes defining a convolution at each of the multiple positions on the spherical manifold with respect to an arbitrarily selected locally-defined gauge. Further, the method includes translating results of the defined convolution at each position based on gauge equivariance to obtain a manifold convolution.

In one aspect, the spherical manifold or sphere is parameterized as an icosahedral grid. The manifold convolution may be distributed to local neighborhoods of the spherical manifold based on the locally-defined gauges. Each kernel associated with each position of the multiple positions is a locally-varying kernel derived from a same function. Each of the defined convolutions at each position is computed with a locally connected layer. Thus, reference frames or arbitrary gauges are selected from each position of the sphere and a convolution is computed at each position and then combined to form a final result.

In one aspect, a gauge transform and its corresponding representation are applied to a two-dimensional convolution to obtain a generalized definition of a convolution operation. A feature is translated at a specific position on the arbitrary manifold to a reference frame or locally-defined gauge at the specific position.

Aspects of the present disclosure are directed to processing signals of a spherical kind. Examples of spherical signals can arise from imaging devices, such as fish-eye, panoramic or omnidirectional type cameras. Therefore, the proposed implementations have many practical applications including, but not limited to, image recognition, and image segmentation, and detection on recording devices of the aforementioned applications.

Aspects of the present disclosure analyze inputs (e.g., signals such as global temperature or climate data) in a spherical domain or manifold. The proposed implementation impacts climate sciences, for example, weather forecasting using machine learning. For example, the proposed implementation can be used to analyze global temperature trends over time to counter global warming. Similarly, it can be used to track changes on the Earth via obtained imagery from satellites.

Another example application includes autonomous driving vehicles. For example, autonomous driving software can use the proposed implementation by processing three hundred and sixty degree images collected from a surrounding environment, for purposes such as collision avoidance, pedestrian detection, localization, etc. In one aspect, cameras are used to classify and identify objects and the inputs of the camera can be projected on a spherical manifold.

The proposed system is also useful for cosmology processing. The cosmological data may include data of observations of the universe that are processed according to a spherical domain. For example, the proposed implementation is suited for processing and analyzing cosmological data where efficiency of processing implementations are especially vital due to an enormous amount of data collected from an observable universe. Tasks could include detecting black holes, or other subtle signals from far galaxies or stars. Other applications for the proposed implementation include shape analysis, molecular modeling, and three-dimensional (3D) shape recognition. For example, a shape model can be indirectly projected on a sphere and analyzed according to aspects of the present disclosure.

Although the aspects of the disclosure are described with respect to a spherical manifold, the same implementations can extend to arbitrary manifolds with little or no modification, making it a general-purpose process for geometric deep learning.

FIG. 1 illustrates an example implementation of a system-on-a-chip (SOC) 100, which may include a central processing unit (CPU) 102 or a multi-core CPU configured for efficient processing of convolutional neural networks. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to generate locally-defined gauges at multiple positions on the spherical manifold, code to compute a convolution at each of the multiple positions on the spherical manifold with respect to a locally-defined gauge, and code to translate results of the convolution at each position based on gauge equivariance to obtain a corresponding manifold transformation.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
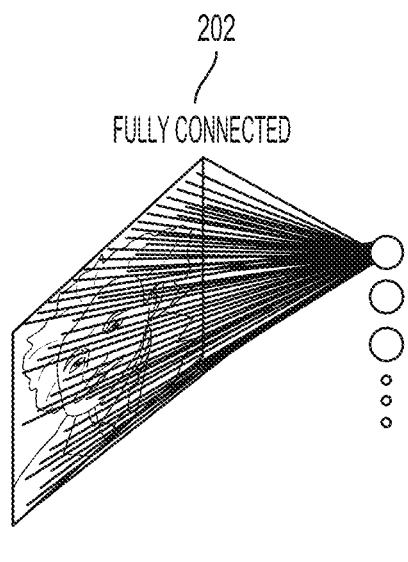
FIGS. 2A, 2B, and 2C are diagrams illustrating a neural network in accordance with aspects of the present disclosure.
Figure 2B:
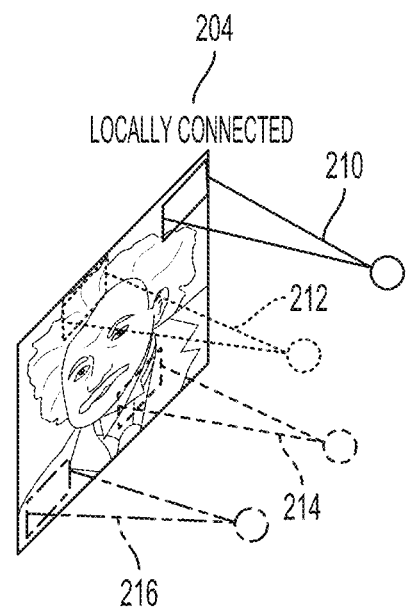

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
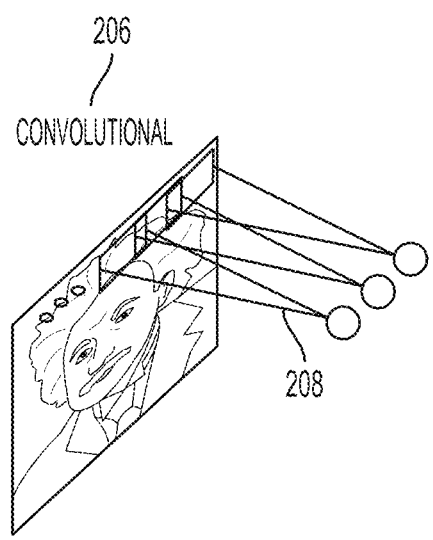

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
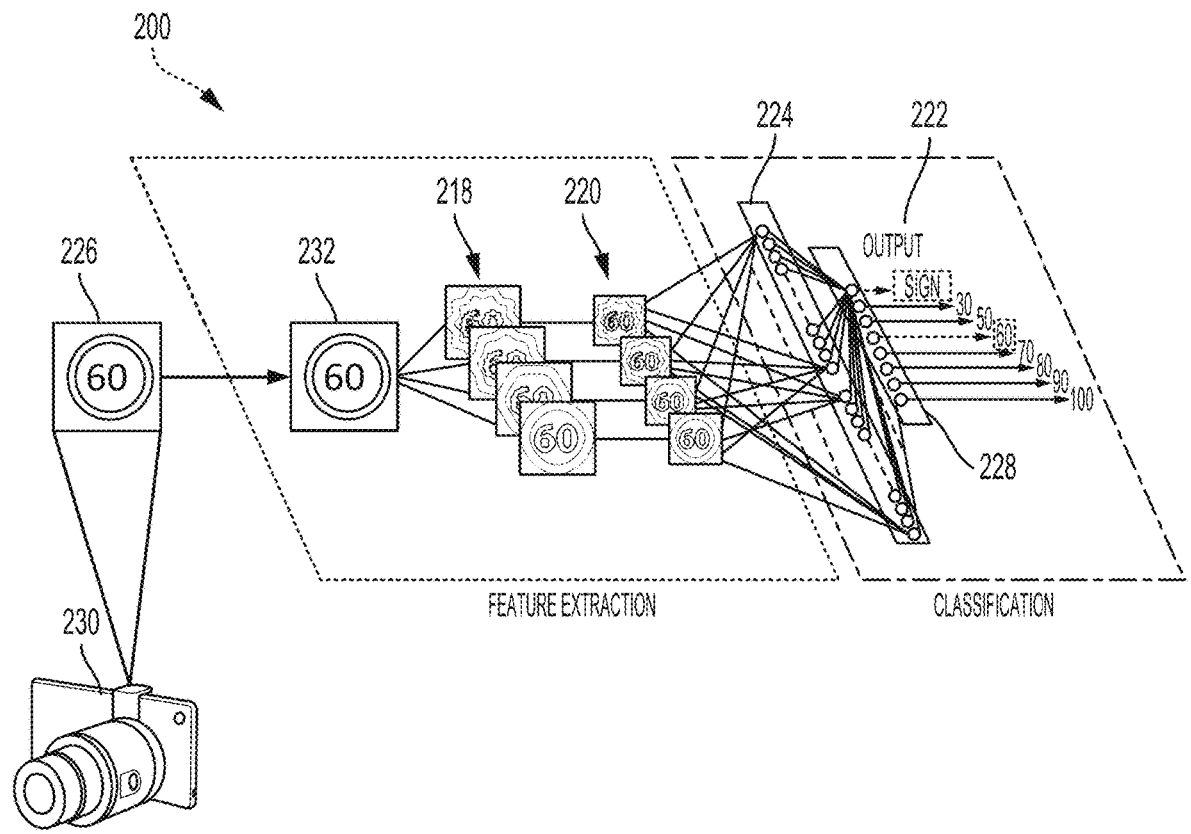
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
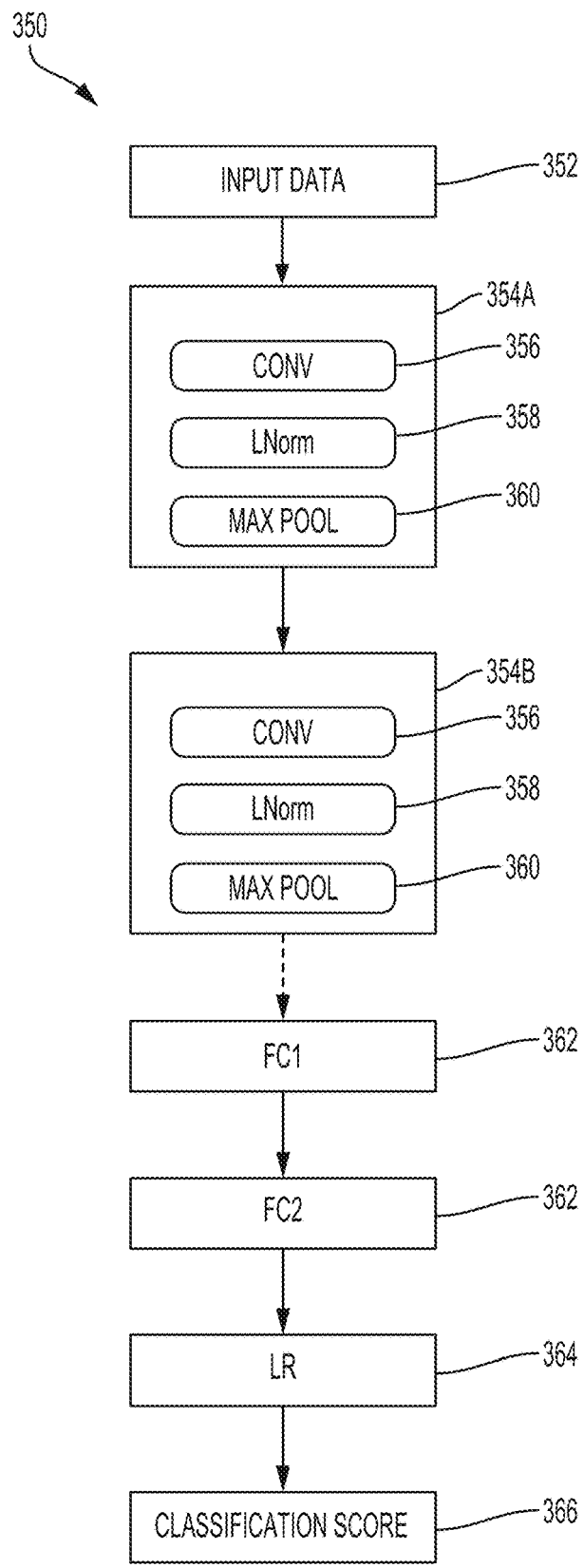
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Aspects of the present disclosure are directed to utilizing gauge equivariant convolutions to design an efficient convolutional network process that can operate on non-planar (e.g., spherical) signals. A locally-defined gauge on the spherical manifold $S^2$ assigns to each point p on the manifold a linear mapping $w_p: \mathbb{R}^2 \to T_p S^2$ from $\mathbb{R}^2$ the standard plane, to $T_p S^2$, the tangent plane of the sphere at point p. Locally-defined gauges allows for a distribution of a computation of a manifold convolution to local neighborhoods. For example, at every position or point p in the spherical manifold $S^2$, a convolution can be defined with respect to an arbitrarily chosen gauge. Finally, gauge equivariance ensures that results of the local computations can be meaningfully translated to each other. That is, a corresponding manifold transformation may be determined based on the gauge equivariance.

The feature spaces in gauge convolutional neural networks (CNNs) may be modelled as fields f over a manifold M For example, the input data may be a vector field of wind directions on Earth, or a scalar field of intensity values on the plane (e.g., a grayscale image), or a field of diffusion tensors on $\mathbb{R}^3$. Such quantities (e.g., scalars, vectors, tensors, and others) may be referred to as geometrical features, which may be applied in a geometrical feature field.

In computer science, a vector or tensor may be considered a list or array of numbers, but from a physical or mathematical perspective, these are geometrical quantities that exist independent of a coordination or choice of basis. To represent a geometrical feature numerically, however, a frame for the tangent space $T_pM$ may be selected at each position $p \in M$. A smooth choice of frame is a gauge. Mathematically, a gauge on a d dimensional manifold M may be defined as a set of linear maps, smoothly parameterized by point p on the manifold, $w_p$: $\mathbb{R}^d \to T_pM$ (see Equation 1). On manifolds with a metric tensor that are also orientable, such as the sphere, the choice of gauge may be limited to a set of oriented orthonormal gauges. In that case, any two gauges w, w' are related at point p by an element $r_p$ of the group of d-dimensional rotations SO(d), so that $w'_p = w_p \circ r_p$.

The application of a gauge transformation may impact the coefficients of geometric features. This is because the choice of gauge is arbitrary. Consider first the coefficients (f(p)=v of a tangent vector V in the tangent space $T_pM$ at position $p \in M$, expressed as a pair of numbers $v=(v_1, v_2)$ relative to an orthogonal frame $(w_p(e_1), w_p(e_2))$ at point or position p, for standard basis vectors $(e_1, e_2)$ of $\mathbb{R}^2$. If the frame is rotated at position p by an element r of the group of planar rotations SO(2), using the formula $w_p \mapsto w_p \circ r$, then the coefficient vector transforms as $v \mapsto r^{-1}v$, treating the planar rotation $r \in SO(2)$ in its matrix representation as a matrix of two rows and two columns acting on the two coefficients of v. A vector is an abstract geometrical quantity, invariant to gauge transformations such that: $V=(w_pr)r^{-1}v=w_pv$. In some aspects, a gauge transformation may be defined as a smoothly varying choice of rotation $r_p \in SO(2)$. However, the present disclosure is not so limited and gauge transformation may be defined otherwise.

Beyond scalars (which are invariant to gauge transformations) and vectors (which transform like $f(p) \mapsto r_p^{-1}f(p)$), more general kinds of geometrical features may be considered. For example, a (2,0)-tensor is (a linear combination of) tensor products $V \otimes W$ of vectors $V, W \in T_pM$. Given a frame, such a tensor may be represented as a d×d matrix. Under a change of frame, a matrix f(p) may transform like $f(p) \mapsto r_pf(p)r_p^{-1}$. The matrix f(p) may be flattened into a $d^2$-dimensional coordinate vector f(p), and the transformation may be expressed as $f(p) \mapsto (r_p \otimes r_p) f(p)$, where $r_p \otimes r_p$ is the Kronecker product.

The tensor product $\rho(r)=r \otimes r$ is an example of a group representation. The group representation may be a map $\rho$: $G \to GL(C, \mathbb{R})$ taking each element r of G (where G is SO(2)) to an invertible matrix $\rho(r)$ that acts on a C-dimensional feature vector. The invertible matrix $\rho(r)$ is considered a representation if it satisfies $\rho(rr')=\rho(r)\rho(r')$, which may be checked for the tensor/Kronecker product.

Thus, geometric feature fields that transform like $f(p) \mapsto \rho(r_p^{-1})f(p)$ under gauge transformations may be generalized for any group representation $\rho$ of SO(2). Such fields are referred to as a $\rho$-field or a field of type $\rho$. In a gauge equivariant CNN, a representation p that determines the kind of features learned by that layer may be selected for each feature space of the network. The network may be constructed such that a gauge transformation applied to the input may result in a corresponding gauge transformation in each feature space. In one example, $\rho$ may be selected to be a block-diagonal, containing for instance a number of scalar fields (1×1 blocks $p_i(r)=1$), a number of vector fields, etc. The number of copies of each type of feature may be referred to as its multiplicity.

For each layer of the network, both the input and output may be interpreted as fields of geometrical features. Applying a gauge transformation, the input coefficients may change ($f(p) \mapsto \rho(r_p^{-1})f(p)$), and a gauge transformation is also performed on the output. That is, in aspects of the present disclosure, a gauge equivariant may be determined.

In accordance with aspects of the present disclosure, a parallel transport may be applied to the feature vectors before summing them. Given a curve from q to p, a vector $W \in T_qM$ may be transported to $T_pM$ by applying a rotation $r_{p \leftarrow q} \in SO(2)$ to its coefficient vector w. Because $r_{p \leftarrow q}w$ may be interpreted as a vector in $T_pM$, the addition to a vector $v \in T_pM$, $v + r_{p \leftarrow q}w$, may be well-defined. For other kinds of geometrical features, parallel transport may acts via $\rho$, for instance, adding $v + \rho(r_{p \leftarrow q})w$.

A local neighborhood around $p \in M$ may be parameterized by the tangent plane via an exponential map. That is, nearby points q may be indexed by tangent vectors using the exponential map, by defining $q_v = \exp_p w_p v$ for $v \in \mathbb{R}^2$ (which may be referred to as "normal coordinates"). The convolution may then be defined by transporting for each nearby point $q_v$, the feature vector $f(q_v)$ to p by computing $\rho(r_{p \leftarrow q_v})f(q_v)$, transforming the resulting features at p using a learned kernel K: $\mathbb{R}^2 \to \mathbb{R}^{C_{out} \times C_{in}}$, and integrating the result over the support of K in $\mathbb{R}^2$. The convolution operation of kernel K on feature f is denoted by $\psi * f$:

$$\psi * f(p) \int_{\mathbb{R}_2} K(v) \rho_{in}(r_{p \leftarrow q_v}) f(q_v) dv. \quad (1)$$

This operation may be considered gauge equivariant if, and in some aspects, only if, K(v) satisfies:

$$K(r^{-1}v) = \rho_{out}(r^{-1})K(v)\rho_{in}(r). \quad (2)$$

In addition to gauge equivariance, equivariance for a spherical CNN to any rotation of the sphere by an element of the three dimensional (3D) rotation group SO(3) may also be achieved. That is, if a 3D rotation is applied to the input of the network, the output is also rotated.

In one example, consider a local patch on the sphere (e.g. the support of the kernel), and the signal defined there. If the sphere is rotated, the patch is moved to another place, and it may change its orientation. Moving the patch may not be a problem: at a new position the same kernel K is applied, so it may be expected that the convolution result at the new position equals the convolution result of the original signal at the old position. However, because the orientation of the kernel is determined by the gauge (which is arbitrary, but fixed) and because the orientation of the patch may be arbitrarily changed by rotating around its center, the kernel and the patch may be matched in a different relative orientation after applying the rotation. Fortunately, because the kernel satisfies Equation 2, the result is equivalent up to a gauge transformation acting by $\rho_{out}$, and thus, SO(3) equivariance is also achieved. Accordingly, in the continuous theory, the gauge equivariant convolution is also SO(3) equivariant.

A signal may be represented as a list of values $f_i = f(p_i)$ associated with a finite number of points $p_i \in V \subset S^2$. The kernel K(v) may be assumed to have local support, such that K(v)=0 if $\|v\| > R$ for some radius R. Equivalently, $q \in S^2$ may only contribute to the convolution result at $p \in S^2$ if the geodesic distance between p and q is smaller than R. Accordingly, the set of neighbors $\mathcal{N}(p)$ of p may be defined as the set of points q within radius R from p.

One way of discretizing the gauge convolution (see Equation 1) is to replace the integral over $\mathbb{R}^2$ (identified with $T_pM$) by a sum over neighbors of p. Each neighbor can be associated with a tangent vector via the logarithmic map: $v_{pq}=\log_p q$. This yields the following approximation:

$$\psi \star f(p) = \sum_{q \in \mathcal{N}(p)} K(v_{pq})\rho_{in}(r_{p \leftarrow q})f(q) \quad (3)$$

The gauge convolution sums messages of the form $K(v_{pq})\rho_{in}(r_{p \leftarrow q})f(p)$. Thus, the feature vectors f(q) of neighbors q are transformed in a way that may, for example, depend: i) on the intrinsic geometry of the manifold via $r_{p \leftarrow q}$ and $v_{pq}$, and ii) by a non-isotropic (but gauge equivariant) learnable kernel $K(v_{pq})$.

The discrete gauge convolution may be computed in a few process steps, some of which may be done during pre-computation and some during the forward pass: i) compute logarithmic map $v_{pq}=\log_p q$, ii) compute parallel transporter $r_{p \leftarrow q}$, iii) construction/parameterization of the kernel, and iv) the linear contraction of the kernel and the signal.

Computing the logarithmic map and parallel transporters on a general manifold or mesh may be complex. Moreover, because the actual geometry of $M=S^2$ is known (not just a discrete approximation), the accuracy of the log-maps and transporters computed is not affected by the grid type or resolution as it would be if only for example, a mesh approximated the sphere.

Note that because $r_{p \leftarrow q}$ is a planar rotation, it may be determined by where it sends a single (non-zero) vector. A first basis vector $b_1^q=w_q((1,0))$ may be expressed in 3D Euclidean coordinates. The first basis vector $b_1^q$ is rotated by the angle $\angle(p,q)=\arccos \langle p, q\rangle$ between p and q around the axis p×q which is orthogonal to the pq plane. The resulting vector lies in the tangent plane at p. Then $r_{p \leftarrow q}$ is determined as the angle between this vector and the first basis vector $b_1^p=w_p((1,0))$ in $T_pS^2$.

In some aspects, the transport angles may be pre-computed for every point p in the grid V and every $q \in \mathcal{N}(p)$. This results in an array of angles of size num_v×num_neigh where num_v=and num_neigh=$\max_{p \in v}|\mathcal{N}(p)|$ is the maximum neighborhood size. Nodes with a non-maximal number of neighbors, may be padded with zeros.

For each $p \in V$ and $q \in \mathcal{N}(p)$ compute $v_{pq}=\log_p q$, which is the vector in $T_pS^2$ that points in the direction of q and has length equal to the geodesic distance between p and q. One way to compute the log map is to project the 3D Euclidean difference vector q−p to the tangent plane at p. This produces a vector $\tilde{v}$ which has the right direction. Then, the length of $\tilde{v}$ may be scaled so that it matches the geodesic distance d(p,q) (which may be referred to as the arc length):

$$\log_p q = d(p,q) \frac{q - \langle p, q\rangle p}{\|q - \langle p, q\rangle p\|} \quad (4)$$

The result $v_{pq}=\log_p q$ may be expressed in polar coordinates. This provides two arrays log_map_r (the length/radial coordinate of v) and log_map_angle (the angular part of v, relative to the gauge at p). Both arrays (log_map_r and log_map_angle) are shaped as num_v×num_neigh. as before. Because the geometry and grid are fixed, these arrays are computed only once before training.

The kernel K(v) may be defined as a continuous matrix-valued function of $\mathbb{R}^2$ that satisfies the kernel constraint (see Equation 2). In a classical CNN, operating with a homogeneous grid of pixels in $\mathbb{R}^2$, a small (e.g., 3×3) set of neighboring pixels may be defined as $\mathcal{N}(p)=\{p+v^{(i)}\}$, such that the kernel may be evaluated at a small number (e.g., 9) of points $v^{(i)}$. This results in a parameterization of K as an array with $C_{out} \times C_{in} \times 3 \times 3$ learnable coefficients.

On the sphere, there may be no perfectly homogeneous grids, so depending on the point $p \in V$ where the convolution $\psi \star f$ is evaluated, the neighborhood structure $\mathcal{N}(p)$ may be different. Hence, the points $v_{pq} \in \mathbb{R}^2$ where K is evaluated may differ as well. For this reason, K may be parameterized as a linear combination of analytically-determined continuous basis kernels. The linear coefficients of K may be learned.

Assuming that $\rho_{in}$ and $\rho_{out}$ are block-diagonal with irreducible representations (irreps) as blocks, any SO(2) representation can be brought to this form by a change of basis. In this case, the kernel may take on a block structure as well, with each block corresponding to a particular input/output irreducible representation, with irreducible representations labelled by integer frequency n≥0. A full kernel may be constructed block-wise, where both input and output representation are a single irreducible representation.

The analytical solutions to Equation 2 may be split into an independent radial part and angular part. The solutions for the angular part K(θ) for kernels that map from $\rho_n$ to $\rho_m$ are shown in Table 1, while the radial part is unconstrained. In Table 1, $c_\pm = \cos(m \pm n)\theta$, $s_\pm = \sin(m \pm n)\theta$. Accordingly, if a set of radial functions $\{R_a(r)\}$ are chosen, and $\{K_b(\theta)\}$ is the complete set of angular solutions, the parameterized kernel is: $K(r,\theta)=\Sigma_{ab}w_{ab}\mathcal{R}_i(a)K_b(\theta)$ for weights w. This solution may be denoted as $K_i$, so that the parameterized kernel is $\Sigma_i w_i K_i$. The number of basis-kernels is called num_basis.

TABLE 1

| $\rho_{in} \to \rho_{out}$ | Linearly independent solutions for K(θ) |
|---|---|
| $\rho_0 \to \rho_0$ | 1 |
| $\rho_n \to \rho_0$ | (cos nθ sin nθ), (sin nθ −cos nθ) |
| $\rho_0 \to \rho_m$ | $\begin{pmatrix} \cos m\theta \\ \sin m\theta \end{pmatrix}, \begin{pmatrix} \sin m\theta \\ -\cos m\theta \end{pmatrix}$ |
| $\rho_n \to \rho_m$ | $\begin{pmatrix} c_- & -s_- \\ s_- & c_- \end{pmatrix}, \begin{pmatrix} s_- & c_- \\ -c_- & s_- \end{pmatrix}, \begin{pmatrix} c_+ & s_+ \\ s_+ & -c_+ \end{pmatrix}, \begin{pmatrix} -s_+ & c_+ \\ c_+ & s_+ \end{pmatrix}$ |

Because geometry and grid are fixed, the basis kernels evaluated at all points may be pre-computed. That is, for each $p \in V$ and $q \in \mathcal{N}(p)$, each basis kernel contracted with the input representation $K_i(v_{pq})\rho_{in}(r_{p \leftarrow q})$ may be evaluated. The result of this pre-computation is an array of shape num_basis×num_v×num_neigh×c_out×c_in, where c_in and c_out are dimensionality of $\rho_{in}$ and $\rho_{out}$ and also the number of channels of the input and output signals.

Having computed the basis kernels at each $v_{pq}$, the discretized gauge convolution (see Equation 3) may be computed as a linear contraction. In doing so, the signal f(p), which has shape num_v×c_in, to $\hat{f}$ of shape num_v×num_neigh×c_in may be expanded. As such, $\hat{f}_{pq}$ is the value of the signal at the q-th neighbor of p.

Subsequently, the signal $\hat{f}$ with basis kernels $K_i(v_{pq})\rho_{in}(r_{p \leftarrow q})$ and weights $w_i$ may be contracted to obtain the convolution result $\psi \star f$ of shape num_v×c_out. Because a basis-kernel $K_i$ only acts on one in/out irreducible representation pair, it may be mostly zero.

In some aspects, each layer of a network may be gauge equivariant, including non-linearities. Irreducible representation features do not commute with pointwise nonlinearities. However, a basis may be transformed to a basis in which pointwise non-linearities are approximately gauge equivariant. Thereafter, the basis may be transformed back to the irreducible representations.

For simplicity, assume that the representation is U copies of $\rho_0 \otimes \rho_1 \ldots \otimes \rho_M$. One such copy can be treated as the discrete Fourier modes of a circular signal with band limit M. An inverse Discrete Fourier Transform (DFT) matrix can map these modes to N spatial samples. Under a gauge transformation of a multiple of $2\pi/N$, the samples may be cyclically shifted. The resulting representation can thus be called a regular representation and hence the procedure a regular nonlinearity. Nonlinearities that act pointwise on these samples, such as a rectified linear unit (ReLU), commute with such gauge transformations.

One approach for computing $\psi * f(p)$ is to interpolate the sample values at $\mathcal{N}(p)$ to obtain a continuous function on $\mathbb{R}^2$, and then use quadrature integration to obtain a more precise value for the integral. Quadrature is a general numerical technique for approximating integrals with finite sums. For a region A and a function g, the integral $\int_A g(x) dx$ can be approximated by $\Sigma_{x \in I} \omega_x g(x)$, where $I \subset A$ is a finite set of quadrature points, each with a weight $\omega_x$. The goal is selecting I and $\omega_x$ such that the approximation is accurate (or even exact), for functions g satisfying some regularity assumptions (e.g., being band-limited). The region A may, for example, be a disk with as radius the support radius $\mathcal{R}$ of the kernel.

The signal $\tilde{f}_p$ at $c \in I$ is inferred from the signals at $\mathcal{N}(p)$ by interpolation:

$$\tilde{f}_p(c) = \frac{1}{Z(p, c)} \sum_{q \in N(p)} k(c, q) \rho_{in}(g_{p \leftarrow q}) f(q) \quad (5)$$

where $k(c,q) = \exp(-\|c - \log_p(q)\|^2 / \sigma^2)$ is a Gaussian kernel with scale $\sigma$, measuring distance between c and q in the tangent space, and $Z(p,c) = \Sigma_{q \in \mathcal{N}(p)} k(c,q)$ is a normalizing constant.

The integral may be computed over $\mathbb{R}^2$ by quadrature integration:

$$\psi * f(p) = \sum_{c \in I} \omega_c K(c) \tilde{f}_p(c) \quad (6)$$

The convolution of Equation 6 may be summed over a homogenized neighborhood and thus may be more equivariant to rotations of the sphere. Equivariance may be improved, for instance, if a large number of quadrature points are used, which may increase the computational cost. However, because the composition of linear operations is linear, it may be simplified:

$$\psi * f(p) = \sum_{c \in I_p} \omega_c K(c) \tilde{f}_p(c) \quad (7)$$

$$= \sum_{q \in N(p)} \sum_{c \in I_p} \frac{\omega_c k(c, q)}{Z(p, c)} K(c) \rho_{in}(g_{p \leftarrow q}) f(q) \quad (8)$$

$$= \sum_{q \in N(p)} \hat{K}(p, q) f(q) \quad (9)$$

for a new kernel $$\hat{K}(p, q) = \sum_{c \in I_p} \frac{\omega_c k(c, q)}{Z(p, c)} K(c) \rho_{in}(g_{p \leftarrow q}).$$

The new kernel $\hat{K}$ may be pre-computed once, so that the convolution during run-time involves only a sum over the neighbors, just as in the convolution of Equation 3. The interpolation thus does not affect computational cost.

Figure 4A:
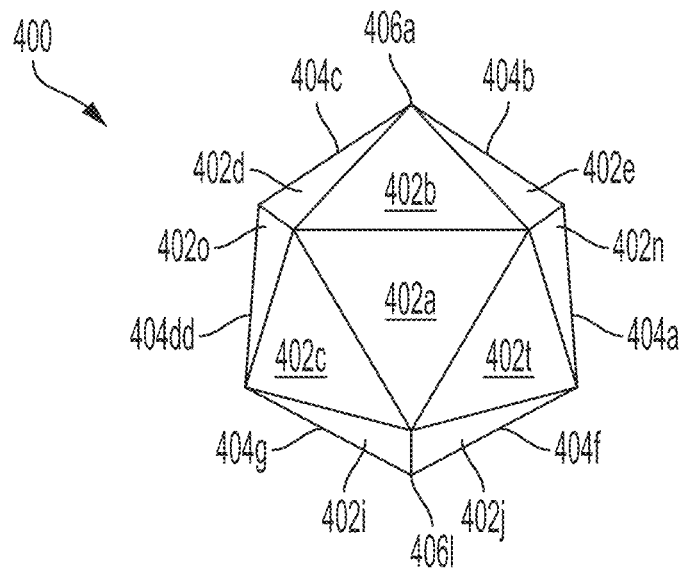
FIG. 4A illustrates a regular icosahedron, which is an approximation of a sphere with flat faces, according to aspects of the present disclosure.

FIG. 4A is a diagram illustrating an example icosahedron 400. Referring to FIG. 4A, the icosahedron 400 is a rough approximation of a sphere. The icosahedron 400 is a convex polyhedron. The icosahedron 400 is a platonic solid resembling a sphere. The icosahedron 400 has twenty flat faces 402a-t, thirty edges 404a-dd, and twelve vertices 406a-l. The points on the icosahedron 400 or its grid have varying distances to an origin, (0,0,0), in three-dimensional Euclidean space. Due to the local-flatness, gauge equivariant convolution could be reduced to a regular two-dimensional convolution (conv2d) with feature transporting performed via simple indexing. Accordingly, many of the mathematical definitions (e.g., exponential maps) associated with the icosahedron 400 are trivialized.

Figure 4B:
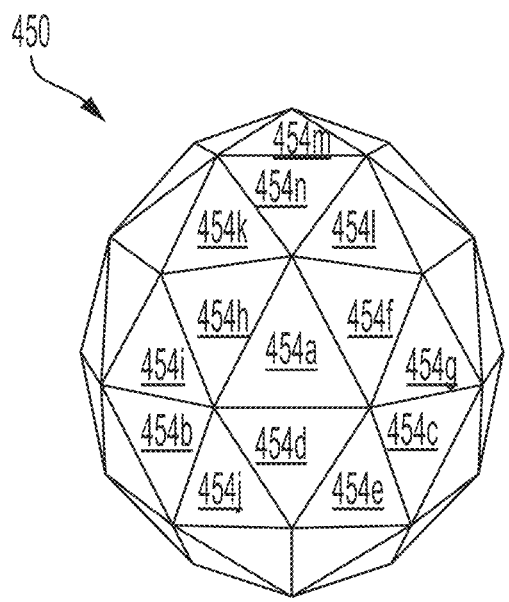
FIG. 4B illustrates an icosphere, according to aspects of the present disclosure.

FIG. 4B is a diagram illustrating an example icosahedral grid, $S^2$ 450 in accordance with aspects of the present disclosure. Referring to FIG. 4B, the icosahedral grid 450 is a particular sampling of this platonic solid of the icosahedron 400. Points or positions on the triangular faces (e.g., 454a-n) can be selected and connected such that they cover an object like a net. Grids may sample or discretize continuous signals over a sphere.

Figure 5A:
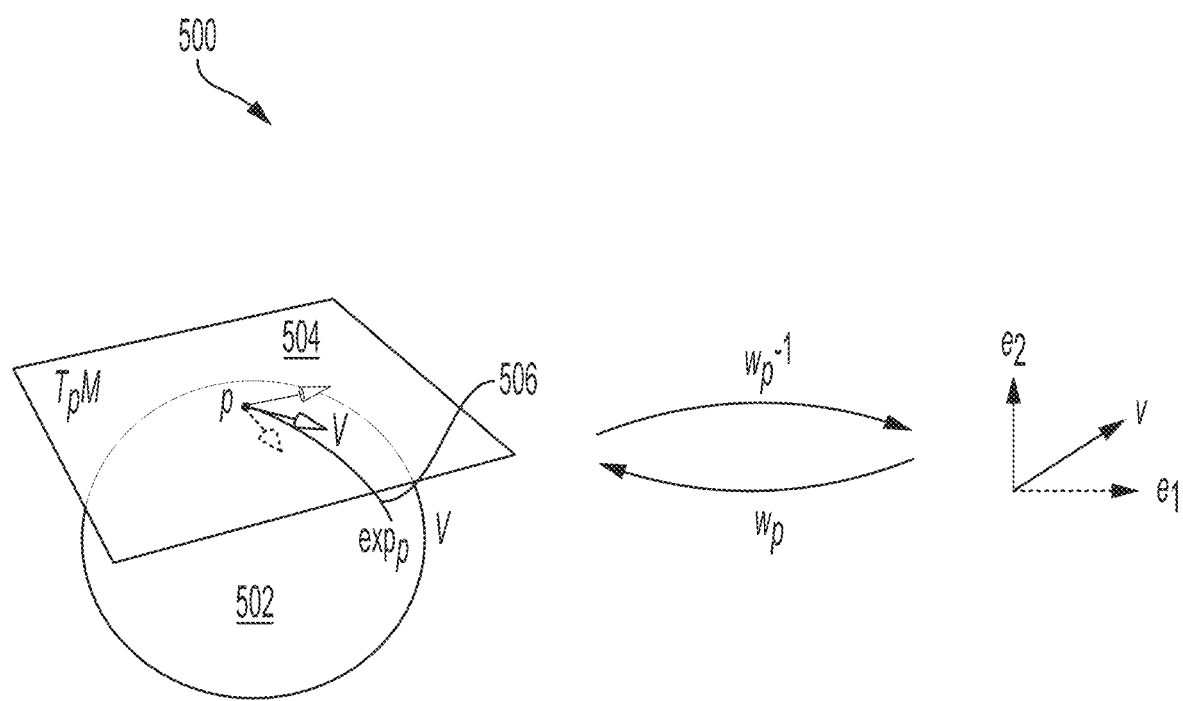
FIG. 5A is a diagram illustrating an exponential mapping from a sphere or spherical manifold to a tangent plane for gauge invariant transformation in accordance with aspects of the present disclosure.

FIG. 5A is a diagram 500 illustrating an exponential mapping from a sphere or spherical manifold 502 to a tangent plane 504 for gauge invariant transformation, in accordance with aspects of the present disclosure. Referring to FIG. 5A, a point p on the spherical manifold 502 is projected to the tangent plane 504. A linear map or gauge $w_p$ is defined as $\mathbb{R}^2 \to T_p M$. Using the gauge $w_p$, the exponential map takes a tangent vector $V \in T_p M$ and follows a geodesic 506 starting at point p with a speed $\|V\|$ for one unit of time to arrive at point $q_v = \exp_p V \in M$ on the spherical manifold 502.

Figure 5B:
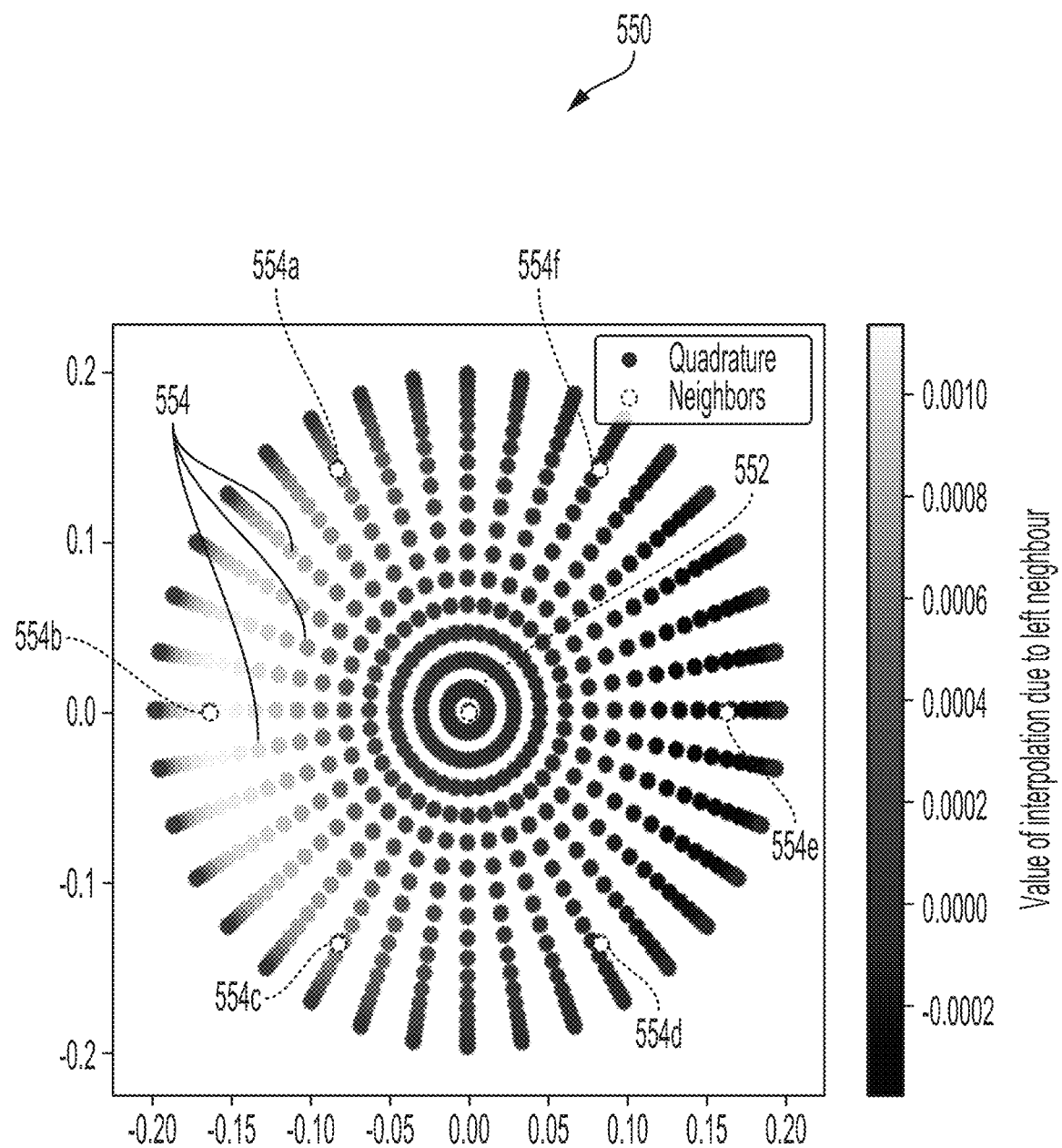
FIG. 5B illustrates a tangent plane showing a point of interest and interpolation points on the tangent plane, according to aspects of the present disclosure.

FIG. 5B illustrates a tangent plane 550 showing a point of interest (p) 552 and interpolation points 554 (e.g., 554a-f) on the tangent plane 550. For each point of interest 552, the set of points are at the same locations relative to their corresponding point of interest. Signals from the neighbors of p (on the icosphere) are interpolated to the interpolation points 554a-554f, thereby steering the gauge, appropriately. A convolution (e.g., the convolution operation proposed in Equation 1) may be performed on these interpolation points 554a-554f. In one aspect, the interpolation is performed as a pre-computation step, so that the number of interpolation does not affect training times. Thus, during run time, summing is over neighbors only instead of all interpolation points.

Because of different interpolation weights and different gauge steering, however, the convolution operation does not treat the neighbors of one vertex (e.g., first point of interest p) the same as the neighbors of another vertex (e.g., point of interest p1 (not shown)). The difference in treatment of the different neighbors is in contrast to both planar CNNs and the icosahedral CNN (e.g., the convolution operation proposed in Equation 1), which can use a single kernel and apply a regular single two-dimensional convolution (conv2d).

A neighborhood expansion implementation improves the convolution implementation. The neighborhood expansion implementation starts with a signal vector f(p) at each vertex p. For each point of interest p, up to Mneighbors q are allocated. The signal vector f(p) is indexed to form a tensor f(p,q) for q=0 . . . M. For example, the tensor f(p,3) is the signal at the third neighbor of vertex p. Subsequently, the convolution operation proposed in Equation 1 may be applied to the tensor f(p,q). The order in which some of the operations of the neighborhood expansion implementation are performed may be adjusted to reduce additional memory requirements relative to convolutions on a regular grid. For example, the efficiency of the neighborhood expansion implementation may be improved by focusing on non-zero blocks of a resulting matrix of the tensor. That is, the non-zero block may be applied to relevant input and output vectors.

Aspects of the present disclosure are more robust (approximately equivariant) to arbitrary group actions of SO(3) (e.g., the group of 3D rotations), faster and much more scalable than other implementations (e.g., implementations that operate according to Fourier domain, which are computationally restrictive).

Figure 6:
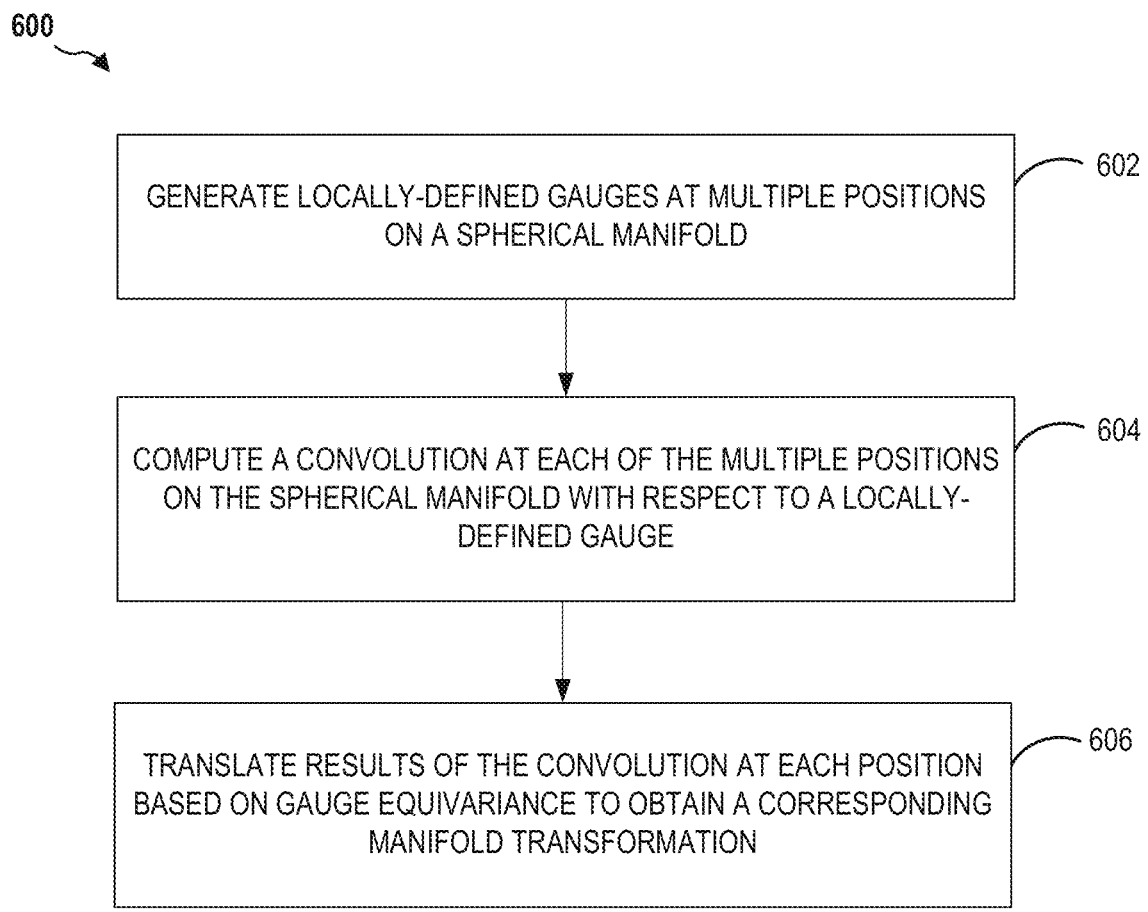
FIG. 6 illustrates a method for generating a convolutional neural network to operate on a spherical manifold, in accordance with aspects of the present disclosure.

FIG. 6 is a diagram illustrating a method 600 for generating a convolutional neural network to operate on a spherical manifold, in accordance with aspects of the present disclosure. As shown in FIG. 6, at block 602, locally-defined gauges are generated at multiple positions on the spherical manifold. The locally-defined gauges correspond to tangent planes and their corresponding positions of interest. For example, referring to FIG. 5A, a linear map or gauge $w_p$ is defined as $\mathbb{R}^2 \to T_p M$. Using the gauge $w_p$, the exponential map takes a tangent vector $V \in T_p M$ and follows the geodesic 506 starting at point p with speed $\|V\|$ for one unit of time to arrive at point $q_v = \exp_p V \in M$ on the spherical manifold 502.

At block 604, a convolution is computed at each of the multiple positions on the spherical manifold with respect to locally-defined gauge. For instance, as described in reference to Equation 1, a convolution may be defined by transporting for each nearby point $q_v$, the feature vector $f(q_v)$ to p by computing $\rho(r_{p \leftarrow q_v}) f(q_v)$. In some aspects, the locally-defined gauges may be arbitrarily selected. Additionally, the locally defined gauges may be defined differently at different positions of the manifold.

At block 606, results of the convolution are translated at each position based on gauge equivariance to obtain a corresponding manifold transformation. As described in reference to Equation 1, a convolution is defined such that the resulting features at point p may be transformed using a learned kernel K: $\mathbb{R}^2 \to \mathbb{R}^{C_{out} \times C_{in}}$, and integrating the result over the support of K in $\mathbb{R}^2$.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method, comprising:
    receiving, by an artificial neural network (ANN), an input comprising a spherical signal in a spherical manifold, the spherical signal generated by an imaging device;
    generating a plurality of locally-defined gauges at a plurality of positions on the spherical manifold;
    computing, by the ANN, a gauge-equivariant convolution for the input at each of the plurality of positions on the spherical manifold with respect to a locally-defined gauge of the plurality of locally-defined gauges, the plurality of locally-defined gauges assigning to each of the plurality of positions a linear mapping from a standard plane to a position on a tangent plane of the spherical manifold and the gauge equivariant convolution being based on a learned kernel constraint for determining transformations that are equivariant to rotation of the spherical manifold; and
    performing image recognition, by the ANN, by identifying and classifying an object on the spherical manifold by applying the gauge-equivariant convolution to the input.

2. The processor-implemented method of claim 1, in which for each position of interest a set of interpolation positions are included on each tangent plane, which corresponds to the plurality of locally-defined gauges and their corresponding positions of interest.

3. The processor-implemented method of claim 1, further comprising interpolating signals from neighboring positions of a position of interest on the spherical manifold to neighboring interpolation points on the tangent plane, which corresponds to the plurality of locally-defined gauges and their corresponding positions of interest.

4. The processor-implemented method of claim 3, further comprising defining the gauge-equivariant convolution on the neighboring interpolation points.

5. The processor-implemented method of claim 3, further comprising:
    indexing a signal vector of the position of interest to generate a tensor associated with a neighboring position; and
    performing a convolution operation on the tensor by applying non-zero blocks of a resulting matrix of the tensor.

6. The processor-implemented method of claim 1, further comprising parameterizing the spherical manifold as one of an array of predefined shapes.

7. The processor-implemented method of claim 1, further comprising distributing a corresponding manifold transformation to local neighborhoods of the spherical manifold based on the plurality of locally-defined gauges.

8. The processor-implemented method of claim 1, in which each kernel associated with each position of the plurality of positions is a locally-varying kernel derived from a same function.

9. The processor-implemented method of claim 1, in which each of the gauge-equivariant convolutions computed at each position is computed with a locally connected layer.

10. An apparatus comprising:
    at least one memory; and
    at least one processor coupled to the at least one memory, the at least one processor configured:
        to receive, by an artificial neural network (ANN), an input comprising a spherical signal in a spherical manifold, the spherical signal generated by an imaging device;
        to generate a plurality of locally-defined gauges at a plurality of positions on a spherical manifold;
        to compute, by the ANN, a gauge-equivariant convolution for the input at each of the plurality of positions on the spherical manifold with respect to a locally-defined gauge, the plurality of locally-defined gauges assigning to each of the plurality of positions a linear mapping from a standard plane to a position on a tangent plane of the spherical manifold and the gauge equivariant convolution being based on a learned kernel constraint to determine transformations that are equivariant to rotation of the spherical manifold; and
        to perform image recognition, by the ANN, by identifying and classifying an object on the spherical manifold by applying the gauge-equivariant convolution to the input.

11. The apparatus of claim 10, in which for each position of interest a set of interpolation positions are included on each tangent plane, which corresponds to the plurality of locally-defined gauges and their corresponding positions of interest.

12. The apparatus of claim 10, in which the at least one processor is further configured to interpolate signals from neighboring positions of a position of interest on the spherical manifold to neighboring interpolation points on the tangent plane, which corresponds to the plurality of locally-defined gauges and their corresponding positions of interest.

13. The apparatus of claim 12, in which the at least one processor is further configured to define the gauge-equivariant convolution on the neighboring interpolation points.

14. The apparatus of claim 12, in which the at least one processor is further configured:
    to index a signal vector of the position of interest to generate a tensor associated with a neighboring position; and
    to perform a convolution operation on the tensor by applying non-zero blocks of a resulting matrix of the tensor.

15. The apparatus of claim 10, in which the at least one processor is further configured to parameterize the spherical manifold as one of an array of predefined shapes.

16. The apparatus of claim 10, in which the at least one processor is further configured to distribute a corresponding manifold transformation to local neighborhoods of the spherical manifold based on the plurality of locally-defined gauges.

17. The apparatus of claim 10, in which each kernel associated with each position of the plurality of positions is a locally-varying kernel derived from a same function.

18. The apparatus of claim 10, in which each of the gauge-equivariant convolution defined at each position is computed with a locally connected layer.

19. An apparatus comprising:
- means for receiving, by an artificial neural network (ANN), an input comprising a spherical signal in a spherical manifold, the spherical signal generated by an imaging device;
- means for generating a plurality of locally-defined gauges at a plurality of positions on a spherical manifold;
- means for computing, by the ANN, a gauge-equivariant convolution for the input at each of the plurality of positions on the spherical manifold with respect to a locally-defined gauge, the plurality of locally-defined gauges assigning to each of the plurality of positions a linear mapping from a standard plane to a position on a tangent plane of the spherical manifold and the gauge equivariant convolution being based on a learned kernel constraint to determine transformations that are equivariant to rotation of the spherical manifold; and
- means for performing image recognition, by the ANN, by identifying and classifying an object on the spherical manifold by applying the gauge-equivariant convolution to the input.

20. The apparatus of claim 19, in which, for each position of interest, a set of interpolation positions are included on each tangent plane, which corresponds to the plurality of locally-defined gauges and their corresponding positions of interest.

21. The apparatus of claim 19, further comprising means for interpolating signals from neighboring positions of a position of interest on the spherical manifold to neighboring interpolation points on the tangent plane, which corresponds to the plurality of locally-defined gauges and their corresponding positions of interest.

22. The apparatus of claim 21, further comprising means for computing the gauge-equivariant convolution on the neighboring interpolation points.

23. The apparatus of claim 21, further comprising:
- means for indexing a signal vector of the position of interest to generate a tensor associated with a neighboring position; and
- means for performing a convolution operation on the tensor by applying non-zero blocks of a resulting matrix of the tensor.

24. The apparatus of claim 19, further comprising means for parameterizing the spherical manifold as one of an array of predefined shapes.

25. The apparatus of claim 19, further comprising means for distributing a corresponding manifold transformation to local neighborhoods of the spherical manifold based on the plurality of locally-defined gauges.

26. A non-transitory computer-readable medium having program code recorded thereon, the program code executed by a processor and comprising:
- program code to receive, by an artificial neural network (ANN), an input comprising a spherical signal in a spherical manifold, the spherical signal generated by an imaging device;
- program code to generate a plurality of locally-defined gauges at a plurality of positions on a spherical manifold;
- program code to compute, by the ANN, a gauge-equivariant convolution for the input at each of the plurality of positions on the spherical manifold with respect to a locally-defined gauge, the plurality of locally-defined gauges assigning to each of the plurality of positions a linear mapping from a standard plane to a position on a tangent plane of the spherical manifold and the gauge equivariant convolution being based on a learned kernel constraint to determine transformations that are equivariant to rotation of the spherical manifold; and
- program code to perform image recognition, by the ANN, by identifying and classifying an object on the spherical manifold by applying the gauge-equivariant convolution to the input.

27. The non-transitory computer-readable medium of claim 26, in which for each position of interest a set of interpolation positions are included on each tangent plane, which corresponds to the plurality of locally-defined gauges and their corresponding positions of interest.

28. The non-transitory computer-readable medium of claim 26, in which the program code further includes program code to interpolate signals from neighboring positions of a position of interest on the spherical manifold to neighboring interpolation points on the tangent plane, which corresponds to the plurality of locally-defined gauges and their corresponding positions of interest.

* * * * *